United States Patent

Howard

[11] Patent Number: 5,940,546
[45] Date of Patent: Aug. 17, 1999

[54] APPARATUS FOR GUIDING A MANUALLY-OPERATED SCANNING DEVICE

[75] Inventor: John Avery Howard, Palo Alto, Calif.

[73] Assignee: Apple Computer, Inc., Cupertino, Calif.

[21] Appl. No.: 08/546,513

[22] Filed: Sep. 12, 1997

[51] Int. Cl.⁶ .................................................. H04N 1/24
[52] U.S. Cl. ............................................ 382/313; 358/473
[58] Field of Search ................................. 358/473, 471, 358/488; 382/313, 314, 315; H04N 1/04

[56] References Cited

U.S. PATENT DOCUMENTS

| | | | |
|---|---|---|---|
| 4,716,291 | 12/1987 | Sakamoto et al. | 358/473 |
| 4,772,954 | 9/1988 | Shin et al. | 382/313 |
| 4,800,444 | 1/1989 | Suzuki et al. | 358/473 |
| 5,301,243 | 4/1994 | Olschafskie et al. | 382/314 |
| 5,365,605 | 11/1994 | Hosogoe et al. | 382/313 |
| 5,686,720 | 11/1997 | Tullis | 358/473 |

*Primary Examiner*—Kim Yen Vu
*Assistant Examiner*—Cheukfan Lee
*Attorney, Agent, or Firm*—Blakely, Sokoloff, Taylor & Zafman

[57] ABSTRACT

Apparatus for scanning an image comprising a manually-operated scanning device with a photoelectric source and having a light tunnel extending from the photoelectric source to a side of the manually-operated scanning device. The scanning device with light tunnels offers high contrast edges and encourages proper alignment of the image being scanned. In one embodiment, the scanning device has a light tunnel extending from each vertical side corresponding to and illuminating the horizontal axis to be scanned. In another embodiment, the scanning device has, in addition to light tunnels illuminating the horizontal axis, light tunnels extending from the front or horizontal side of the scanning device to illuminate the vertical boundary that is scanned by the scanning device. The light tunnels in the invention provide the user with a highly visible reference of exactly where the manually-operated scanning device's scan window is located at a particular instance.

7 Claims, 3 Drawing Sheets

APPARATUS FOR GUIDING A MANUALLY-OPERATED SCANNING DEVICE

FIELD OF THE INVENTION

The invention relates generally to devices for scanning, and more particularly to an apparatus for guiding a manually-operated or hand-held scanning device.

BACKGROUND OF THE INVENTION

Scanning devices refers to devices that utilize a magnetic or photoelectric source (e.g., a light-emitting diode) to sense and convert an image into corresponding electric signals for processing by an electronic apparatus. The image converted includes text, graphics, and pictures. Images may be color or black and white. Scanning devices are used, for example, to convert a document to an electronic file, or a photographic image to an electronic graphic file. Other uses for scanning devices include sensing an image to be sent over a voice frequency circuit (facsimile device) or to be reproduced (copier device).

There are generally two types of scanning devices. The first type of scanning device is the flat-bed scanner that operates by placing a document with an image on the scanning device housing and a motor-driven scanning device makes a pass or several passes across the document to sense the image. The other type of scanning device is a manually operated scanning device wherein a hand-held scanning device is directed over a document containing an image by a user or operator. The scan head is located on the bottom of the manually operated scanning device and scans an image as the scanning device is dragged over the image. For example, an image that is a document is converted into corresponding electric signals by dragging the scanning device from the top of the document, line by line, to the bottom of the document.

The scan head of the manually operated scanning device is located on the bottom of the scanning device so that the operator of the scanning device cannot see precisely the image being scanned. The manually-operated scanning device typically contains horizontal and vertical grids or marks on the top opaque surface of the scanning device to act as a reference to direct the operator to the location of the scan head mechanism and the image being scanned at a particular time. The horizontal and vertical grids are the only reference to a user of the location of the scan head mechanism over an image. These grids or marks in the opaque housing of the scanning device are difficult to see because of low contrast between the grids and the housing. A user must pay close attention to maintain the horizontal and vertical grids on precisely the image being scanned at a particular time. Even inputting a simple image on a document with a manually-operated scanning device with grid guide marks can be tedious due to the attentiveness required to scan the document accurately. Thus, there is a need for a manually-operated scanning device that provides grids or marks with high contrast to facilitate and encourage proper alignment of the image being scanned and make the scanning operation less tedious.

SUMMARY AND OBJECTS OF THE INVENTION

The invention relates to an apparatus for scanning an image comprising a manually-operated or hand-held scanning device with a photoelectric source and having a light tunnel extending from the photoelectric source to a side of the manually-operated scanning device. The photoelectric source of the scanning device is part of the scan head mechanism and the mechanism functions to sense and convert an image into corresponding electric signals. An example of a common photoelectric source is a light-emitting diode. The light tunnel extends from this photoelectric source and parasitically uses light from this source to illuminate the tunnel. Light from the tunnel is cast from the side of the scanning device.

In one embodiment, the scanning device has a light tunnel extending from each vertical side corresponding to and illuminating the horizontal axis to be scanned. In this embodiment, light from the light-emitting diode casts light into the light tunnels that extend to the side of the scanning device housing corresponding to the horizontal axis traveled by the scanning device as the device is dragged across an image. In another embodiment, the scanning device has, in addition to light tunnels illuminating the horizontal axis, light tunnels extending from the front or horizontal side of the scanning device to illuminate the vertical boundary that is scanned by the scanning device. The scanning devices with light tunnels offer high contrast edges and encourage proper alignment of the image being scanned. The light tunnels provide the user with a highly visible reference of exactly where the manually operated scanning device's scan window is located at a particular instance.

BRIEF DESCRIPTION OF THE DRAWINGS

The invention is illustrated by way of example and not limitation in the figures of the accompanying drawings, in which like references indicate similar elements and in which.

DETAILED DESCRIPTION

The invention relates to an apparatus for scanning an image comprising a manually-operated or hand-held scanning device with a photoelectric source and a light tunnel extending from the photoelectric source to a side of the manually-operated scanning device. The light tunnel is illuminated by light from the photoelectric source to transmit light from the photoelectric source beyond the side of the scanning device to the image being scanned.

Figure 1:
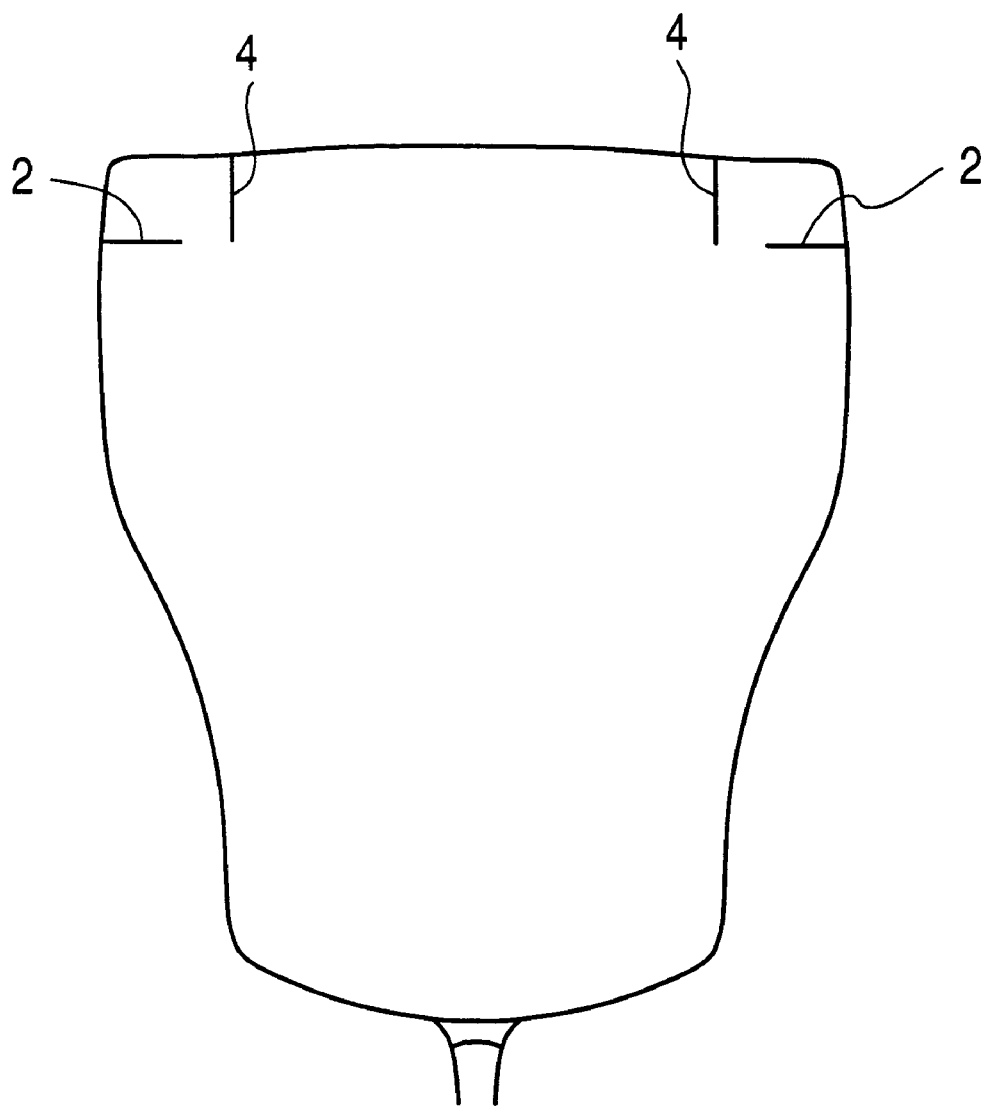
FIG. 1 is a top-view of the prior art scanning device.

FIG. 1 presents a top view of the prior art manually-operated scanning device. The prior art manually-operated scanning device uses horizontal grids 2 in the typically opaque surface of the top of the scanning device to act as a reference to the operator of the location of the scan head mechanism (not shown) and the image being scanned. The prior art scanning device in FIG. 1 also features a pair of vertical grids 4 in the top of the scanning device, the distance between the vertical grids 4 corresponding to the width of the scan head mechanism (not shown) in the scanning device.

Figure 2:
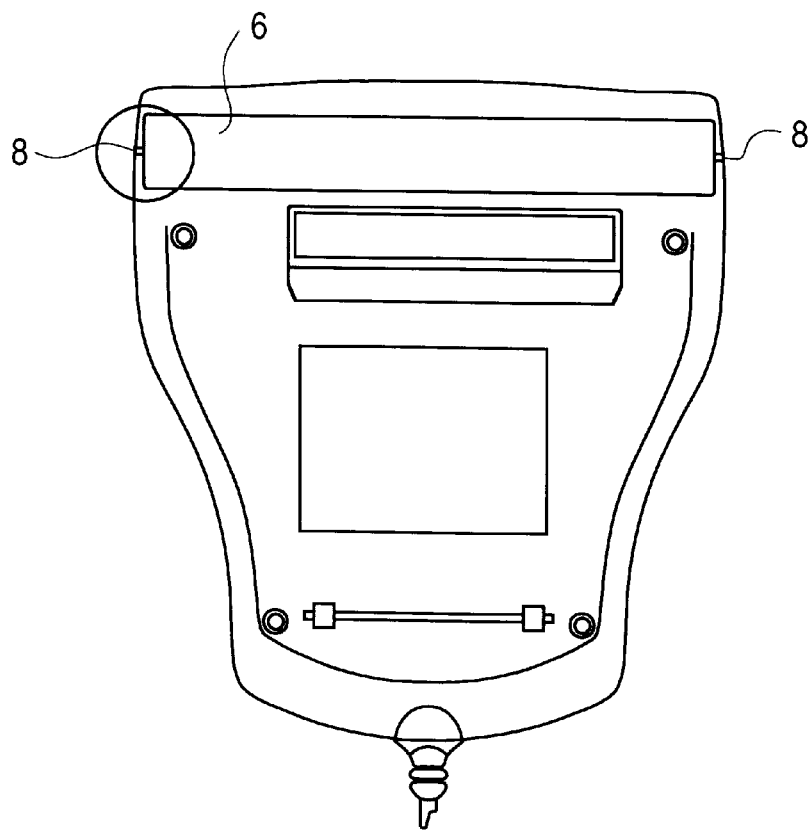
FIG. 2 is a bottom view of an embodiment of the invention with a pair of light tunnels to illuminate the horizontal axis of an image traveled by the scanning device.
Figure 3:
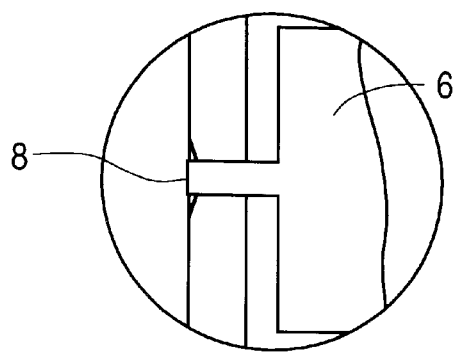
FIG. 3 is an enlargement of the bottom view of an embodiment of the invention.

FIGS. 2 and 3 present an embodiment of the invention wherein the scanning device of the invention has a light tunnel extending perpendicularly from each vertical side corresponding to and illuminating the horizontal axis traveled by the scan head mechanism of the scanning device. FIG. 2 presents a bottom view of a manually-operated scanning device. FIG. 2 illustrates a scan head mechanism 6 containing a photoelectric source. A typical photoelectric source used in scanning devices to convert an image into corresponding electric signals is a light emitting diode.

FIG. 2 also illustrates a pair of light tunnels 8 extending from the photoelectric source of the scan head mechanism 8 to the vertical sides of the scanning device so that light is cast from the sides of the scanning device. The light tunnels 8 of the embodiment depicted in FIG. 2 correspond to and illuminate at least a portion of the horizontal axis traveled and processed by the scan head mechanism 6.

FIG. 3 illustrates an enlargement of a portion of FIG. 2. Specifically, FIG. 3 shows a single light tunnel 8 extending from the photoelectric source in the scan head mechanism 6 to illuminate the horizontal axis traveled and processed by the scan head mechanism 6.

FIGS. 2 and 3 demonstrate an embodiment of the invention having light tunnels corresponding to the vertical axis to be scanned. The invention contemplates, for example, embodiments whereby light tunnels illuminate not only the horizontal axis, but also the vertical axis corresponding to the vertical boundary corresponding to the width of the scan head mechanism.

Figure 4:
FIG. 4 is a side view of an embodiment of the invention demonstrating a light tunnel to illuminate the horizontal axis of an image to be scanned.
Figure 5:
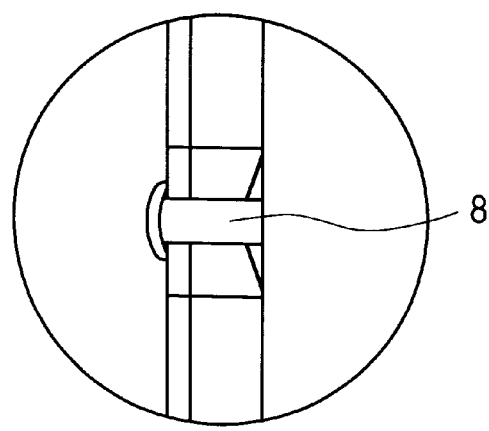
FIG. 5 is an enlargement of the side view of an embodiment of the invention.

FIGS. 4 and 5 present a side view of an embodiment of the invention. FIGS. 4 and 5 show the light tunnel 8 extending from the vertical side of the scanning device. Light transmitted by the photoelectric source illuminates the light tunnel 8, and this light is emitted form the light tunnel along the horizontal axis traveled by the scan head mechanism.

The preferred embodiment of the invention contemplates the parasitic use of light from the photoelectric light source used in the scan head mechanism to convert an image to electric signals. Because the invention uses light from the photoelectric source of the scanning device, the amount of light cast into the light tunnel(s) will vary based on the power of the photoelectric source. The invention contemplates, however, that there will be sufficient light in the light tunnel to provide a user with a highly visible reference of exactly where the manually-operated scanning device's scan window is located at a particular instance. The invention also contemplates that light may be provided by a photoelectric source other than the photoelectric source used in the scan head mechanism to sense and convert an image to corresponding electric signals.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are to be regarded in an illustrative rather than a restrictive sense.

What is claimed is:

1. An apparatus for scanning an image comprising:
    a scanring device housing having opposing side portions and a bottom portion;
    a photoelectric source disposed in the housing; and
    wherein the housing has a light tunnel extending from the photoelectric source to at least one of the opposing side portions of the scanning device housing.

2. The scanning apparatus of claim 1, wherein the light tunnel extends from at least one of the opposing side portions of the scanning device housing to illuminate the horizontal axis to be scanned.

3. The scanning apparatus of claim 1, wherein the scanning device housing comprises a front side and the opposing side portions are disposed adjacent the front side, said apparatus further comprising:
    a pair of light tunnels extending from the photoelectric source to the front side of the scanning device to illuminate the vertical boundary that is to be scanned.

4. The scanning apparatus of claim 1, wherein the scanning device housing comprises a front side and the opposing side portions are disposed adjacent the front side and the light-tunnel is a first light tunnel extending from the sides of the scanning device to illuminate the horizontal axis to be scanned, the apparatus futher comprising:
    a pair of second light tunnels extend from the photoelectric source to the front side of the scanning device to illuminate the vertical boundary to be scanned.

5. The apparatus of claim 1, wherein the photoelectric source comprises a light-emitting diode.

6. A scanning apparatus comprising:
    a housing having a top portion, a bottom portion, and opposing side portions,
    a scan head including a photoelectric source disposed in the housing,
    wherein at least one of the opposing side portions of the housing includes an opening exposing the photoelectric source, the distance between the opening and the photoelectric source defining a tunnel.

7. The scanning apparatus of claim 6, wherein the housing comprises a front side and the opposing side portions are disposed adjacent the front side wherein the opening in at least one of the opposing side portions is a first opening, the light extending from the photoelectric source through the at least one first opening is adapted to illuminate a horizontal axis to be scanned, the apparatus further comprising:
    at least one second opening in the front side of the housing exposing the photoelectric source through the vertical opening adapted to illuminate a vertical axis to be scanned.

\* \* \* \* \*